United States Patent [19]

Lai

[11] Patent Number: 5,075,842
[45] Date of Patent: Dec. 24, 1991

[54] DISABLING TAG BIT RECOGNITION AND ALLOWING PRIVILEGED OPERATIONS TO OCCUR IN AN OBJECT-ORIENTED MEMORY PROTECTION MECHANISM

[75] Inventor: Konrad K. Lai, Aloha, Oreg.

[73] Assignee: Intel Corporation, Santa Clara, Calif.

[21] Appl. No.: 455,625

[22] Filed: Dec. 22, 1989

[51] Int. Cl.$^5$ .......................... G06F 9/34; G06F 12/06; G06F 12/14

[52] U.S. Cl. .................. 395/425; 364/231.4; 364/231.6; 364/245.5; 364/245.7; 364/246.6; 364/246.9; 364/247; 364/247.2; 364/251; 364/251.7; 364/253.2; 364/255.1; 364/255.4; 364/255.5; 364/283.1; 364/286.6; 364/DIG. 1

[58] Field of Search ............................ 364/200, 900

[56] References Cited

U.S. PATENT DOCUMENTS

| | | |
|---|---|---|
| 4,325,120 | 3/1982 | Colley et al. ...................... 364/200 |
| 4,408,274 | 10/1983 | Wheatley et al. ................. 364/200 |
| 4,442,484 | 4/1984 | Childs, Jr. et al. ............... 364/200 |
| 4,480,306 | 10/1984 | Bachman et al. .................. 364/200 |
| 4,498,131 | 2/1985 | Bratt et al. ........................ 364/200 |
| 4,498,132 | 2/1985 | Ahlstrom et al. .................. 364/200 |
| 4,525,780 | 6/1985 | Bratt et al. ........................ 364/200 |
| 4,791,550 | 12/1988 | Stevenson et al. ................ 364/200 |
| 4,811,208 | 3/1989 | Myers et al. ...................... 364/200 |
| 4,814,971 | 3/1989 | Thatte .............................. 364/200 |

Primary Examiner—Michael R. Fleming
Assistant Examiner—Ayaz R. Sheikh
Attorney, Agent, or Firm—Owen L. Lamb

[57] ABSTRACT

A tag bit is associated with each word stored in a memory. When the tag bit is a 0 the word is a data word and when a 1 the word is a valid access descriptor. Access descriptors include an object index for selecting an object in the address space of the memory, and a rights field specifying the permissible operations on a paged object selected by the access descriptor. An access descriptor in a processor control block contains a tag enable bit. An object table has stored therein object descriptors for use by an addressing mechanism in forming physical addresses to the page table object. The page table has stored therein page table entries for use by the addressing mechanism in forming physical addresses to the paged object. One of the access descriptors in a process control block contains an execution mode bit which represents either a user mode or a supervisor mode. Logic asserts the tag signal upon the condition that the tag enable bit is in the disabled state and the execution mode bit is set to supervisor mode. Logic responds to the tag signal and compares the page rights field of the page table entry with the rights field of the access descriptor and asserts a fault if the access permitted by the page rights field is inconsistent with the rights field of the access descriptor.

4 Claims, 4 Drawing Sheets

DISABLING TAG BIT RECOGNITION AND ALLOWING PRIVILEGED OPERATIONS TO OCCUR IN AN OBJECT-ORIENTED MEMORY PROTECTION MECHANISM

CROSS REFERENCE TO RELATED APPLICATIONS

Application Ser. No. 07/455,626 filed 12,22,89 entitled "Synchronous Communication Between Execution Environments in a Data Processing System Employing an Object-Oriented Memory Protection Mechanism", assigned to Intel Corporation, the assignee of the present invention.

Application Ser. No. 07/455,635 filed 12,22,89 entitled "Type Management and Control in an Object-Oriented Memory Protection Mechanism", assigned to Intel Corporation, the assignee of the present invention.

Application Ser. No. 07/455,585 filed 12,22,89 entitled "Object Lifetime Control in an Object-Oriented Memory Protection Mechanism", assigned to Intel Corporation, the assignee of the present invention.

BACKGROUND OF THE INVENTION

1. Field of the Invention

The invention relates to data processing systems, and more particularly to a memory-accessing mechanism which protects memory locations from unauthorized access.

2. Description of the Related Art

Modern computer systems are organized such that all information within the system is represented by hardware-recognized, memory-resident information structures called objects. This is known as an object-oriented computer architecture. An object is a package of data that is a representation of related information maintained in a contiguouslyaddressed set of memory locations.

In an object-oriented programming system, each type or class of object has a set of operations that are permitted to be performed on the objects that are members of the class. This is known as an object-based access mechanism. The internal structure of objects is hidden from the programmer. The programmer can manipulate the objects only with the permitted operations. Access to an object is by means of a pointer to the object called an access descriptor. An access descriptor describes the kind of representation (rep) rights (such as read rights or write rights) which define the various kinds of access to the object that are permitted by the holder of the access descriptor for that object.

U.S. Pat. No. 4,325,120 granted Apr. 13, 1982, to Colley et al. and assigned to Intel Corporation, discloses an object-based access mechanism in which two basic types of objects are recognized and distinguished by a processor. The first basic type is a data segment which contains ordinary data. The second basic type is an access list which contains access descriptors which are used to access information, that is other objects, in the memory. Each access descriptor provides information for locating and defining the extent of access to an object associated with that access descriptor. Unauthorized access to the memory is controlled by a protection mechanism which checks the access descriptor utilized in the process of generating references to objects in the memory.

In early computer systems, the architecture provided for two program states, the supervisor state and the problem state, with the processor switching between the two states. In the problem state, all privileged instructions (I/O instructions, protection instructions, and a group of control instructions) are invalid. In the supervisor state, all instructions are valid. When a privileged instruction is encountered in the problem state, a privileged-operation exception is recognized, a program interrupt occurs and the operation is suppressed. Protection is provided to protect the contents of certain areas of main memory from destruction or misuse. Locations are protected by identifying blocks of storage with a key and comparing this key against a protection key supplied with the data to be stored. A mismatch will cause an exception to be recognized, a program interrupt occurs and the operation is suppressed.

The architecture of the Colley et al. patent eliminated the need for different execution states within the processor, such as the supervisor state and the problem state. In that object-oriented architecture there was no need for privileged instructions that are executed only when the processor is in the supervisor state. Memory protection was achieved by allowing or prohibiting access to certain objects, rather than certain memory locations.

In an object-oriented architecture, segments are the basis for all addressing and protection. A segment is a single linear address space with a defined size or length. Segments exist in main memory and are associated with a starting or base address. To determine the actual physical address of an item of data within a segment or an object, one adds the position of the item within the segment (called its displacement) to the segment's base address. In systems with segmented addressing, moving a segment requires the updating of its base address. However, the base address information can be distributed throughout memory and in the processor's registers. This means that if a segment is moved, many copies of its base address will have to be located and updated to reflect the change. To obviate this problem, the Colley et al. architecture brings together all of the information about a segment and places that information in a segment table. It then requires that all references to a segment obtain the necessary base address and length information from this table. Any reference to the segment will access the segment descriptor and obtain the correct and current base address and length information.

To further refine this mechanism, the Colley et al. system provides a second level of address mapping above that provided by the segment table. Each program unit is supplied at run time with a list of segment numbers (indices for segment descriptors) for all of the segments it may need to access during execution of the program. The program selects a particular segment by specifying, as part of each operand's address in an instruction, an index into its list of accessible segments. This list is known as its access list.

This type of mechanism is called a "capability-based protection mechanism" and provides excellent protection; however, it necessitates very complex programming procedures.

In object-oriented architectures, there is no notion of privileged instructions. A privileged instruction is an instruction that can be executed only when the central processing unit (CPU) is in the supervisor state. The supervisor state is that state in which the supervisor program is running, the supervisor program being a control program that coordinates the use of resources and maintains the flow of CPU operations. When in the supervisor state, the user's program cannot be executed. The user's program is executed when the CPU is in the problem state, which is a state during which the CPU cannot execute input/output and other privileged instructions. This is called a "state-based protection mechanism".

For a modern data processing system supporting an object oriented architecture to also be able to support the state protection mechanism in the same hardware, such a system must be compatible with operating systems of an earlier type employing supervisor and user states.

It is therefore an object of the present invention to provide a memory access protection mechanism that supports either a capability-based protection mechanism or a statebased protection mechanism.

SUMMARY OF THE INVENTION

In the present invention, objects are not separated into two basic types as in the Colley et al. application. Instead, each 32-bit word stored in memory has associated with it a 33rd bit known as a tag. If this tag bit is set to one, then the word is an access descriptor. If the tag bit is set to zero, then the word is a data word. So, instead of having two basic types of objects, one object containing a list of data segments and the other object containing a list of access descriptors, these separate lists are eliminated. In the present type of system, the user can only do an operation requiring an access descriptor if the word fetched from memory that is supposed to be an access descriptor has its tag bit set to one. If the tag bit is zero, then it is an invalid access descriptor.

The present invention has the further advantage that an operating system based upon the two-state protection model can be ported to a computer system constructed in accordance with the principles of the present invention without having to make any major modifications.

The present invention has the advantage that an object can contain access descriptors and/or data; that is, any binary information. Access descriptors and data can reside in the same object and can be interleaved in any arbitrary order. The protection mechanism of the present invention protects the integrity of memory from user interference by use of the tag bit and not by using problem/supervisor states.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

DESCRIPTION OF THE PREFERRED EMBODIMENT

Figure 1:
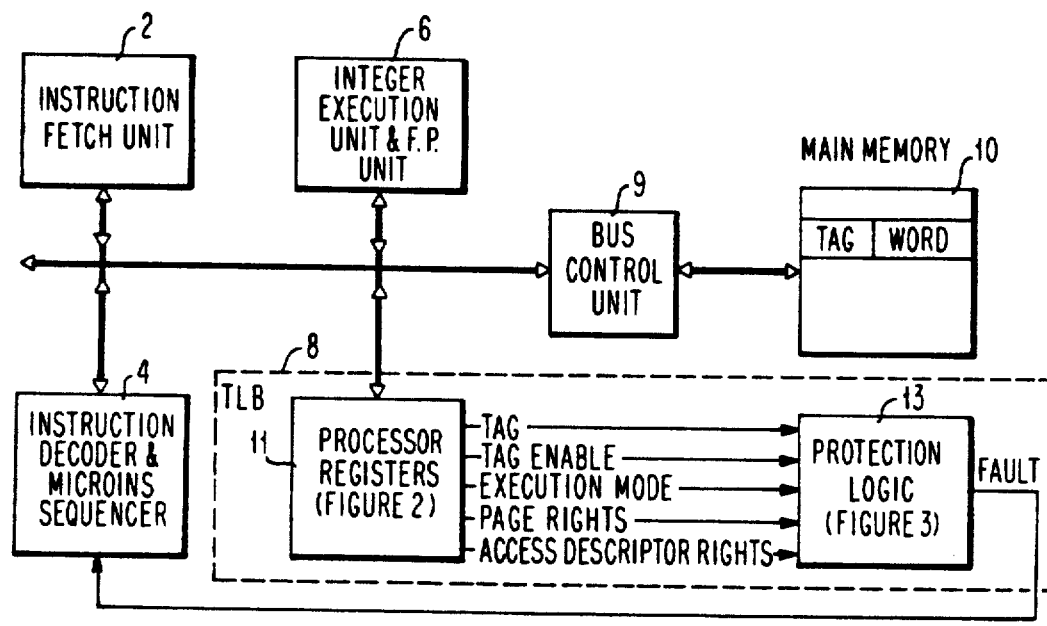
FIG. 1 is a functional block diagram of each of the major components of the microprocessor in which the invention is embodied.

Referring now to FIG. 1, the microprocessor is logically subdivided into five major units: the Instruction Fetch Unit (2), the Instruction Decoder and Microinstruction Sequencer (4), the Translation Lookaside Buffer (8), the Bus Control Unit (9), and the Integer Execution Unit and Floating Point Unit (6).

Communication paths between all of these units include a data bus, a microinstruction bus, and control signals, including a microinstruction-valid signal. The microinstruction bus controls and synchronizes the activities of the autonomous units. Each of the units is described briefly below.

The Instruction Fetch Unit (IFU) fetches, prefetches, and caches instructions from the main memory for use by the Instruction Decoder (ID).

The Instruction Decoder (ID) decodes and controls instruction (macrocode) execution. It decodes instructions, performs operand addressing and fetching, handles branch instructions (i.e., instruction pointer manipulation), and either emits execution microinstructions or starts microprogram flows.

The Microinstruction Sequencer (MIS) sequences microcode flows to handle initialization, macroinstructions that are too complex to handle directly, and exception and interrupt conditions. The MIS contains a microcode ROM and sequencing logic for microcode flows. The functions that the MIS performs include: fetch the next microinstruction, microprogram branching, handle exception conditions, and in conjunction with the ID, detect macroinstruction-boundary and trace events.

The Integer Execution Unit (IEU) executes most of the microinstructions issued by the ID and the MIS. It contains the registers visible to the programmer, scratch registers used by microcode, an ALU, and the logic needed to execute its instructions. The Floating Point Unit (FPU) contains the logic needed to perform floating point operations, and integer multiply and divide.

The Translation Lookaside Buffer (TLB) performs the address translation needed to implement virtual memory mechanisms. The address translation and memory protection uses an associative table of storage descriptors and page table entries. The TLB contains an address cache, an address adder, and memory protection checking hardware.

Finally, the Bus Control Logic (BCL) pipelines and sequences external bus accesses. The BCL contains the interface hardware to the external local bus, manages the bus protocol, and recognizes external events (e.g., interrupts, initialization).

EXECUTION MODES

The system provides two modes of execution, User mode and Supervisor mode, to support the efficient emulation of conventional operating systems. The system does not define the notion of privileged instructions. All instructions can be executed in either mode. A program gains privilege by nature of its access representation (rep) rights and its execution mode. The page rep rights in the current linear address space are interpreted differently depending on the execution mode. Storage used by the operating system generally has page rep rights which do not allow user access, but may be read-only or read/write in the Supervisor mode.

In an untagged system, the call system instruction described in copending patent application Ser. No. 07/455,626 is the only way to change the execution mode from user mode to supervisor mode without a fault occurring. As described in Ser. No. 07/455,626, the system domain object contains a set of entry procedures for the operating system.

The accessing mechanism will now be described with reference to FIG. 2.

An object (38) is stored in main memory space (10). A 32-bit word in the object may have a 33d bit which is a tag bit.

An instruction (14) in the memory may contain an address (20) which is a virtual memory address to the object (38). The address is stored in one of the processor registers in the register space (11) of the processor. The address includes an offset (22) and an access descriptor (24). The access descriptor (24) is a 32-bit word which has a tag. The access descriptor includes an object index (34) and a rights field (35). The object index provides an offset into an object table (42) which contains storage descriptors for objects stored in the memory, one of the objects being a page table (44). The descriptor includes an encoded field (50) and a base address (52). An object is described by an object table entry in the object table (42) which provides the mapping information for the physical addresses of the storage blocks and pages which together represent the physical objects. For a simple object, the object is represented by a block in physical address space directly. The physical base address (52) is stored in the object table entry. Thus, the entry (44) is a simple object descriptor. The information within the object is located by using a simple offset (22) in the virtual address (20).

A paged object is represented by a set of physical pages using a single-level page table (44). The object table entry for a paged object, called a paged object descriptor, contains the physical base address of the page table, which is an array of page table entries for the pages. The page table entry is found by indexing using the page index located in the offset (22).

Another object, called the processor control block, or PRCB (28), is fetched from memory and stored in the processor register space. Additionally, a process control block or PCB (64) is also fetched from memory and stored in the processor register space. An entry (30) in the PRCB contains information about the current process and also contains a tag enable bit (40) which is encoded to indicate that the system in use contains tag bits. The PCB (64) contains an entry (31) which includes an execution mode bit (41) which is encoded to indicate for systems that do not use tagging whether the processor is in the supervisor state or is in the user state. For systems in which tagging is enabled, the tag-bit information is combined in a checking circuit, protection logic (13), to ensure that the tag bit is a one, indicating a valid access descriptor is being used for the memory reference. The protection logic (13) is shown in more detail in FIG. 3. On the other hand, in a system in which tagging is not utilized, the execution mode bit, when set to supervisor state, forces a one into the error-checking circuitry so that the protection mechanism will not indicate an error when an access descriptor is used to reference data. When the execution mode bit indicates user mode and a supervisor type of instruction is executed, for example the SEND instruction, the access descriptor in it will have a tag bit being zero which will cause a fault in the protection logic.

Figure 3:
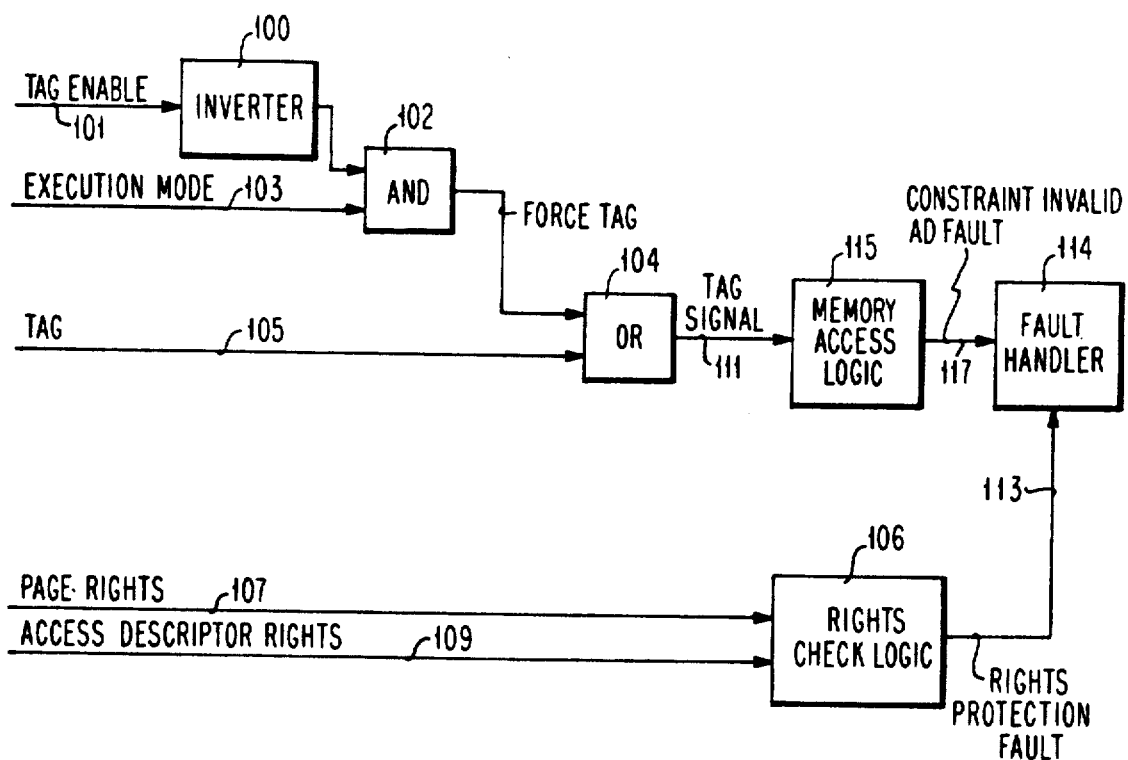
FIG. 3 is a more detailed block diagram of the protection logic of FIG. 1.

Referring now to FIG. 3, the rights check logic (106) is supplied with an access descriptor with the tag bit on in all appropriate circumstances. If the tag enable bit (101) is not asserted and the execution mode (103) is set to supervisor, then an output from AND (102) forces a tag bit into OR circuit (104). If the tag enable bit (101) is asserted and an access descriptor is encountered, the tag line (105) will be asserted as the tag is a one for an access descriptor. Regardless of whether the execution mode is set to supervisor or user mode, then an output from OR circuit (104) supplies the tag signal to the rights check logic. If an attempt is made to reference memory using data as an AD, then this signal (111) is 0, and the CONSTRAINT.INVALID_AD fault is signalled to the fault handler (114). If the access descriptor rights field (109) points to an object of the right type, and the access descriptor rights are consistent with the page rights (107), then the operation is permitted. Otherwise a RIGHTS PROTECTION fault (113) is signalled to the fault handler (114).

In user mode, the user cannot specify a valid access descriptor, since these are privileged instructions that can only be executed in supervisor mode. If an access descriptor is encountered in user mode, neither the force tag nor the tag bit is 1 and this causes an INVALID ACCESS DESCRIPTOR fault to be indicated.

To summarize, the tag-enable flag, which is stored internally in the processor, controls the interpretation of information inside the processor. If tagging is disabled and the execution mode is not supervisor, the behavior of the checking logic is the same as if tagging were enabled. If tagging is disabled, and the execution mode is supervisor, then the behavior of the checking logic is also the same except that any value that the checking logic requires to be an access descriptor is assumed to be an access descriptor; that is, an implicit tag is supplied to the checking logic. In a system where tags are not used, the processor-tag enable is set to zero. This allows processor operations such as dispatching to occur and the data to be interpreted as an access descriptor. Any reference to an access descriptor by a process therefore becomes a privileged operation which is only allowed to occur if the process is in the supervisor mode.

OBJECT ADDRESSING

Three different address spaces are defined, Logical Address Space, Virtual Address Space and Physical Address Space. The Logical Address Space is accessed with a Linear Address, which includes an Object Selector and an Object Offset. The Virtual Address Space is accessed with an Object Index and an Object Offset. The Physical Address Space is accessed with an Object/Page Table Entry and Block/Page Offset.

A logical address space is mapped onto a virtual address space which is mapped onto a physical address space. An address in each space has a unique structure as described below.

PHYSICAL ADDRESS SPACE

The physical address space covers read-write memory, read-only memory, and memory-mapped I/0.

Communication with the physical world is in terms of physical addresses. The physical address space is byte addressable and must guarantee atomic and indivisible access (read or write) for memory addresses that are aligned according to the size of the access, i.e. a word access must be aligned to a word boundary. An indivisible access guarantees that a processor reading or writing a set of memory locations will complete the operation before another processor can read or write the same location. An atomic operation allows a processor to read and modify a set of memory locations with the guarantee that another processor doing an atomic operation on the same block will be delayed.

VIRTUAL ADDRESS SPACE

The virtual address space is a collection of independent address spaces called objects. Given that any datum within an object is located by a simple offset, the virtual address of the datum is specified by two components: an object index that selects the desired address space and an object offset that selects the datum within the address space. The size of the virtual address space is the product of the number of objects allowed and the maximum size of each object.

An object is also defined as the unit of protection. To control access within the virtual address space, the system protects and restricts the generation of object indices. An access descriptor (AD), is defined by the system to contain an object index. The system protects the AD pointer by not allowing ordinary data to be used to represent it. An access descriptor (AD) can point to any of the objects in the virtual address space. The virtual address is, therefore, specified by a protected object index (i.e. an access descriptor) and an unprotected offset into the object.

LOGICAL ADDRESS SPACE

Access descriptors, directly or indirectly accessible, are conceptually assembled in sets to form yet a third type of address space called a logical (or instantaneous) address space. The logical address space defines the visibility of the execution environment. Logical addresses are mapped onto the single virtual address space. For maximum flexibility, two types of logical addresses are defined: linear address and structured address.

The first type, the linear address, is defined by four objects that form the execution environment. A linear address is used to represent the conventional notion of a process address space. Linear addresses, interpreted within a given environment, are mapped onto the virtual address space. The mapping of linear addresses to virtual addresses is a fundamental part of the instruction interpretation process. In a linear address, an operand specifier supplies only an offset; the current linear address space is implied. The upper two bits of a linear address implicitly selects one of the four objects that define the execution environment, while the remaining 30 bits is an offset into the selected object.

The second type, the structured address, is defined by a virtual address (ie. access descriptor plus offset). The structured address is used to invoke advanced object-oriented protection features. In a structured address, an operand specifier supplies a virtual address. Since the system does not allow specifying an AD directly in the instruction stream, the AD part of the virtual address must be specified indirectly using an AD selector in an operand specifier within the instruction. An AD selector specifies an AD stored locally in the processor registers. This limits the instantaneous addressability of objects to those accessible by the ADs in the processor registers only.

ACCESS DESCRIPTORS AND THEIR RIGHTS

An access descriptor (AD) is a protected pointer to an object in the address space. The system protects access descriptors from accidental or malicious creation and modification.

A program cannot address an object directly, but only indirectly via an access descriptor in the execution environment. Since a program cannot reference an object without an access descriptor to it, a program's visibility can be restricted to only those objects it needs to access.

An access descriptor contains the following information: Object Index, Rights, and Lifetime bit. The Object Index selects the object. The rights specify read rights, write rights and type rights in an AD. The rights indicate the permissible operations on the object. Rights are associated with an access descriptor and not with the object itself. It is thus possible to have different rights to the same object by selecting different access descriptors. The Life-time bit indicates the lifetime of the object that an AD references and is more fully described in copending application Ser. No. 07/455,585.

AD TO OBJECT MAPPING

Objects are referenced using access descriptors which are system-wide protected pointers. The object index in an access descriptor selects an object table entry (OTE) in the system wide object table object (42). An object table entry specifies the location, size, type, etc. of the referenced object.

STORAGE BLOCKS AND PAGES

An object is physically composed of a storage block and/or a set of pages. A block is a contiguous area in the physical address space. A block can be used to represent a simple object, a page table, or a page table directory.

The base address of a storage block points to the first visible byte of the block. The base address of a storage block must be aligned on a 64-byte physical address boundary. The length of a block varies from 64 bytes to 4096 bytes. A block cannot span across a 4K byte boundary.

An object can also be represented by a set of pages with one or two level(s) of page tables. The first level table can be a storage block instead of a page. The pages that define the object (38) are described by the page table (44). A page is a fixed size block of 4K bytes with base address aligned on a 4K-byte boundary.

TAGGING

An object may contain access descriptors and/or data, i.e. any binary information. Access descriptors and data can reside in the same object and can be interleaved in any arbitrary order.

In some systems, a tag bit is associated with each 4-byte aligned word in memory to indicate whether the word is data or possibly a valid access descriptor. A valid access descriptor must be aligned to a 4-byte boundary with a its tag bit set to one. A tag bit of zero is used to indicate that the word contains data or an access descriptor that cannot be dereferenced, that is cannot be used to reference the contents of an object.

In other systems, the tag bit is not available. In such systems, the interpretation of a word as data or an access descriptor depends upon the operation.

In a word-aligned read or write of the whole word, the tag bit is either preserved or set to zero depending on the operation. In an non-word aligned read, or a partial read of a word, the tag bit of the returned value is always forced to zero. The data manipulation (arithmetic or logical) instructions generate results with tag bits forced to zero, independently of the tag bits of the source operands.

TYPED OBJECTS

The internal organization of certain objects is defined by specifying and interpreting data structures within their address spaces. These objects play a key role in the protection system, the interprocess/interprocessor communication system, and the storage management system. To recognize these system-defined objects and to control their use, each one may be identified by a code. The code is called the object type and it is maintained with the object's address mapping information. As described more fully in patent application Ser. No. 07/455,635, users may invent their own object types and assign them unique type codes.

OBJECT OFFSET

An object offset is a 32-bit ordinal used to specify a datum within an object. It is capable of pointing to either data or access descriptors in an object. An object offset is divided into a number of fields. The interpretation of these fields is dependent on the object representation.

OBJECT SIZE

The size of an object is specified in encoded fields (50) of the object table entry (OTE). The object offset in a virtual address plus the operand size is compared with the size of the referenced object on every address translation. This operation is called bounds checking and prevents reference beyond the specified object of a datum which may belong to another object.

OBJECT REPRESENTATION

An object is described by the object table entry which provides the mapping information for the physical addresses of the storage blocks and pages which together, directly or indirectly, represent the physical object. The system uses three different mapping schemes for different maximum object sizes and to minimize object representation overheads.

Simple Objects. A simple object is represented by a block in physical address space directly. The physical base address is stored directly in the object table entry. Such an entry is called a simple object descriptor.

Paged Objects. A paged object is represented by a set of physical pages using a single-level page table. The object table entry for a paged object, called a paged object descriptor, contains the physical address of a page table, which is an array of page table entries for the pages.

Bipaged Objects. A bipaged object is represented by a set of physical pages using two levels of page tables. The object table entry for a bipaged object, called a bipaged object descriptor, contains the physical address of a page table directory, which is an array of page table entries for page tables.

A simple object is defined by a simple object descriptor and represented by a single block. A simple object descriptor contains the physical base address and the block length. A simple object cannot span across a 4K byte physical address boundary.

A simple object offset is partitioned as follows:

Directory Index DI (bits 22-31). This 10-bit field must be zero. Otherwise a PROTECTION fault is raised.

Page Index PI (bits 12-21). This 10-bit field must be zero. Otherwise a PROTECTION fault is raised.

Block Offset SO (bits 0-11). This 12-bit field is the byte displacement added to the base address of the block to form the physical address for the first byte of the operand.

PAGED OBJECTS

A paged object is described by an object table entry called a paged-object descriptor. Paged objects are implemented with one level of page table. Each page is individually swappable and relocatable, thus not all pages of a paged object need be present in physical address space at the same time. To access an item of a paged object, only the page table and the selected page need to be located in the physical address space.

A paged-object descriptor contains the object length, but does not contain the base addresses (45) of the pages which represent the object. The base address field (45) of a paged-object descriptor contains the base address of the page table block. The length of the page table block is defined by the object length of the object.

A paged object offset (22) is partitioned as follows:

Directory Index, DI (bits 22-31). This 10-bit field must be zero. Otherwise, a PROTECTION fault is raised.

Page Index, PI (bits 12-21). This 10-bit field is used to index into the selected page table (44) for a page table entry.

Page Offset, PO (bits 0-11). This 12-bit field is the byte displacement and is appended to the base address (45) in the page table entry of the page to form the physical address for the first byte of the operand in the paged object (38).

BIPAGED OBJECTS

A bipaged object is described by an object table entry called a bipaged object descriptor. Bipaged objects are implemented with two levels of page tables. Each page or page table is individually swappable and relocatable, thus not all pages or page tables of a bipaged object need be present in physical address space at the same time. To access an item of a bipaged object, only the page table, the selected page table, and the selected page need to be located in the physical address space.

A bipaged object descriptor contains the object length, but does not contain the base addresses of the pages nor page tables which represent the object. The base address field of a bipaged object descriptor contains the base address of the page table directory block. The length of the page table directory block is defined by the object length of the object.

A bipaged object offset is partitioned as follows:

Directory Index, DI (bits 22-31). The directory index selects a page table entry in the page table directory specified by the bipaged object descriptor.

Page Index, PI (bits 12-21). The page index selects a page table entry in the specified page table.

Page Offset, PO (bits 11-0). The page offset is used as an offset into the page. The page offset is appended to the base address (in a page table entry) to form the physical address for the first byte of the operand.

MAPPING TABLES

Object Table Objects

An object table object (42) serves as the root of the virtual address mapping. An object table is an array of 16-byte object table entries. The object index field (34) in an access descriptor selects an object table entry in the object table (OT). Object table entries are described subsequently.

Object tables do not have a system defined system type. Although an AD that is a pointer to an OT has global lifetime, the object table entries (OTEs) or page table entries of an object table (OT) must have local lifetime. This is necessary to support Type Definition Object (TDO) ADs in OTEs and embedded descriptors.

There is one system wide object table (OT) for all processors which share a single system wide virtual address space.

System Defined Object Indices

The system defines the following object indices, which should not be used for any other purposes:

| Object Indices | Purpose |
|---|---|
| 0 | Reserved for empty AD. |
| 1-7 | Preserved |
| 8 | Object Table |
| 9-15 | Preserved |
| 16-31 | Default TDO ADs for object types 0-15 |

Page Tables or Page Table Directories

Page tables are used to provide one or two level(s) of mapping for paged objects and bipaged objects. Page table directories are used to provide the first level of mapping for bipaged objects. Page table directories are described more fully in patent application Ser. No. 07/455,635. Page tables (or page table directories) contain page table entries (or page table directory entries) which define the base address of a page, and other information for virtual memory management and garbage collection.

Page tables and page table directories are system recognized, but are not objects and do not have a system type.

A page table is an array of page table entries, each of which is 4 bytes in length. Each page table entry in a page table describes a page in a paged object or a bipaged object. Each page table entry in a page table directory describes a page table for a bipaged object.

The page table of a paged object or the page table directory of a bipaged object can be variable in size and aligned on any 64-byte boundary. The page tables of a bipaged object must be 4K bytes in size and aligned on 4K bytes boundary.

Page tables and page table directory are not objects and thus cannot be accessed directly in the virtual address space. One approach is to access them using physical addresses. Another approach is to map the page tables to part of the object they are defining. In the second approach, the physical address of the page table directory or the page table must be duplicated. It is a software responsibility to guarantee the physical address alias is updated during page swapping.

DESCRIPTOR FORMATS

Data Words

Figure 5:
FIG. 5 is a diagram of a data word.

FIG. 5 is a diagram of a data word. The fields of a data word are defined as follows:
Data (bits 0-31). This field contains any data value.
Tag (Tag Bit). This bit is 0 for data values.

Access Descriptors Access descriptor

Figure 6:
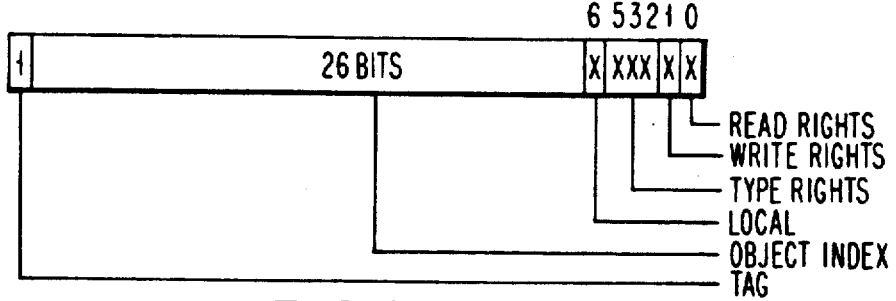
FIG. 6 is a diagram of an access descriptor.

FIG. 6 is a diagram of an access descriptor. The fields of an access descriptor are defined as follows:
Read Rights (bit 0). This bit indicates that reading the contents of the object referenced by this access descriptor is allowed.
Write Rights (bit 1). This bit indicates that writing the contents of the object referenced by this access descriptor is allowed.
Type Rights (bits 2-4). The interpretation of this 3-bit field is determined by the object type of the referenced object.

Local (bit 5)

This bit indicates the object's lifetime. This bit is 0 for a global object and 1 for a local object. Object lifetime is described more fully in patent application Ser. No. 07/455,635.
Object Index (bits 6-31). This 26-bit field selects object table entry in the object table.
Tag (Tag Bit). This bit must be 1 for a valid access descriptor.

Mixed Words

A mixed word is the union of a data word and an access descriptor, i.e. a mixed word can be viewed as either a data word or an access descriptor depending on the context.

The values of a mixed word are divided into the following classes:

(1) Valid Access Descriptor. A valid access descriptor has the tag bit set to 1. This can be dereferenced (used to reference the content of the object) if the object for the corresponding index is defined. The CONSTRAINT.INVALID_AD fault is raised when the tag bit is 0 when an AD is expected.

(2) Data. A data word has the tag bit set to zero. When a data value is generated, the tag bit is always set to zero. When a data value is expected, the tag bit is ignored and interpreted as zero. No fault is raised when the tag bit is 1 when a data value is expected.

Virtual Addresses

Figure 7:
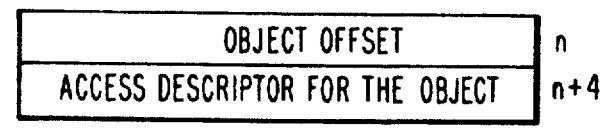
FIG. 7 is a diagram of a virtual address format.
Figure 8:
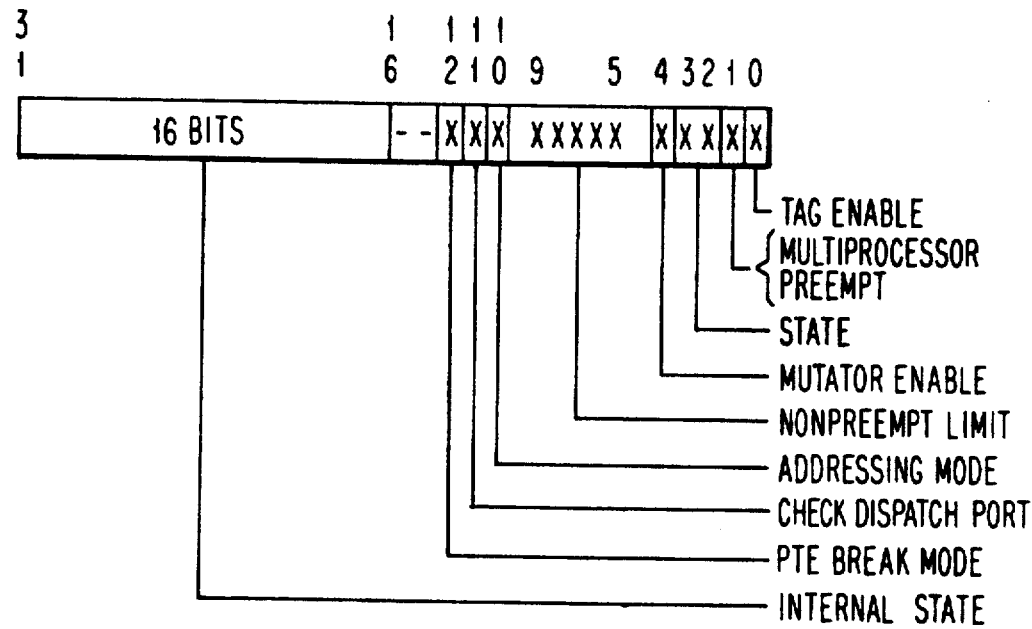
FIG. 8 is a diagram of the processor controls of the processor control block of FIG. 2; and, FIG. 9 is a diagram of the process controls of the process control block of FIG. 2.
Figure 9:
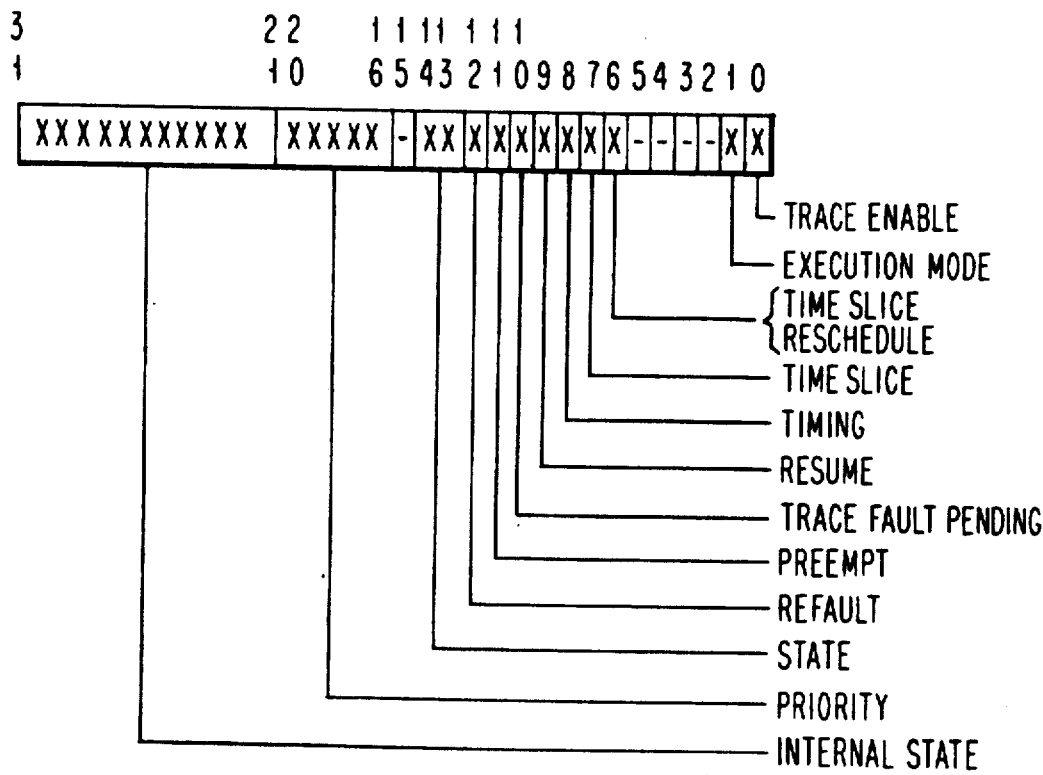

FIG. 7 is a diagram of a virtual address format. The fields of a virtual address are defined as follows:
Object Offset (bytes 0-3). This 32-bit field contains an Ordinal offset into the object referenced by the access descriptor in the virtual address.
Access Descriptor (bytes 4-7). This AD specifies the object referenced by this virtual address. The AD also specifies the permissible operations using this virtual address.

Object Table Entries

An object table (OT) can contain the following types of object table entries. All object table entries are 16 bytes in size. Specific object table entries are identified by the entry type field (bits 96-98) of each object table entry as follows:

- 000—Invalid Object Table Entry
- 001—Embedded Descriptor
- 010—Invalid Simple Object Descriptor
- 011—Simple Object Descriptor
- 100—Invalid Paged Object Descriptor
- 101—Paged Object Descriptor
- 110—Invalid Bipaged Object Descriptor
- 111—Bipaged Object Descriptor The last six object table entries are collectively called storage descriptors. Valid storage descriptors contain physical addresses. Invalid storage descriptors, where the base address field may not be valid, are used to indicate that the selected object cannot be accessed.

The fields of a invalid simple object descriptor, a invalid paged object descriptor, or a invalid bipaged object descriptor are defined as follows:

TDO AD (bits 32-63). This field contains the type definition object AD associated with this object descriptor.

Reserved (bits 68-69). This field must be zero.

Base Address (bits 70-95). This 26-bit field contains the physical base address (in units of 64 bytes) of the block, page table or page table directory. This provides a $2^{**}32$ byte physical address space. This field is uninterpreted in an invalid storage descriptor.

Entry Type (bits 96-98). This 3-bit field indicates the type of object table entries and the definition of the rest of the descriptor.

Access Status (bits 99-103).

This 5-bit field is described in the next section. This field is only defined in a simple object descriptor. This field is preserved for other entry types.

Object Length (bits 114-119).

This field contains the (encoded) length in units of 64 bytes of the storage block referenced by the base address field.

The word "encoded" is used with a length field to indicate that the field contains the actual length minus one instead of the actual length.

In a simple object, this field contains the (encoded) length in units of 64 bytes defined by this descriptor.

In a paged object descriptor, this field contains the (encoded) length in units of 64K bytes, or the number of page table entries in the page table (minus one)/16 defined by this descriptor.

In a bipaged object descriptor, this field contains the (encoded) length in units of 64M bytes, or the number of page table entries in the page table directory (minus one)/16 defined by this descriptor.

Write Back (bit 122). This bit enables write-back caching for the object if the segment or page is cacheable.

Object Type (bits 124-127). This 4-bit field encodes the object type of the object.

Access Status

An access status contains information for the management of blocks and pages. It is found in simple object descriptors and valid page table entries. This field does not appear in an invalid object descriptor, a paged/bipaged object descriptor, nor a page table directory entry.

The fields of an access status are described more fully in patent application Ser. No. 07/455,635.

Page Table Entries

A page table or page table directory contains an array of 4-byte page table directory entries of similar format. Page table entries in a page table directory specify page tables while page table entries in a page table specify pages.

The fields of a valid page table entry or page table directory entry are defined as follows:

Valid (bit 0). This bit is 1 to indicate a valid page table entry or page table directory entry.

Page Rights (bits 1-2). This 2-bit field encodes the permissible operations (read or write) in different execution modes on the content of this page (in a page table entry) or for the pages defined by this page table (in a page table directory entry). Since a page may be controlled by more than one set of page rights, the effective rights is minimum of all page rights.

Access Status (bits 3-7) This 5-bit field is similar to that in a storage descriptor. This field is defined for a page table entry and is preserved for a page table directory entry.

Base Address (bits 12-31). This 20-bit field contains the physical base address (in units pages of 4096 bytes) of the page.

The field of an invalid page table directory entry is defined as follows:

Valid (bit 0). This bit is 0 to indicates an invalid page table directory entry.

Virtual Address Translation

Figure 2:
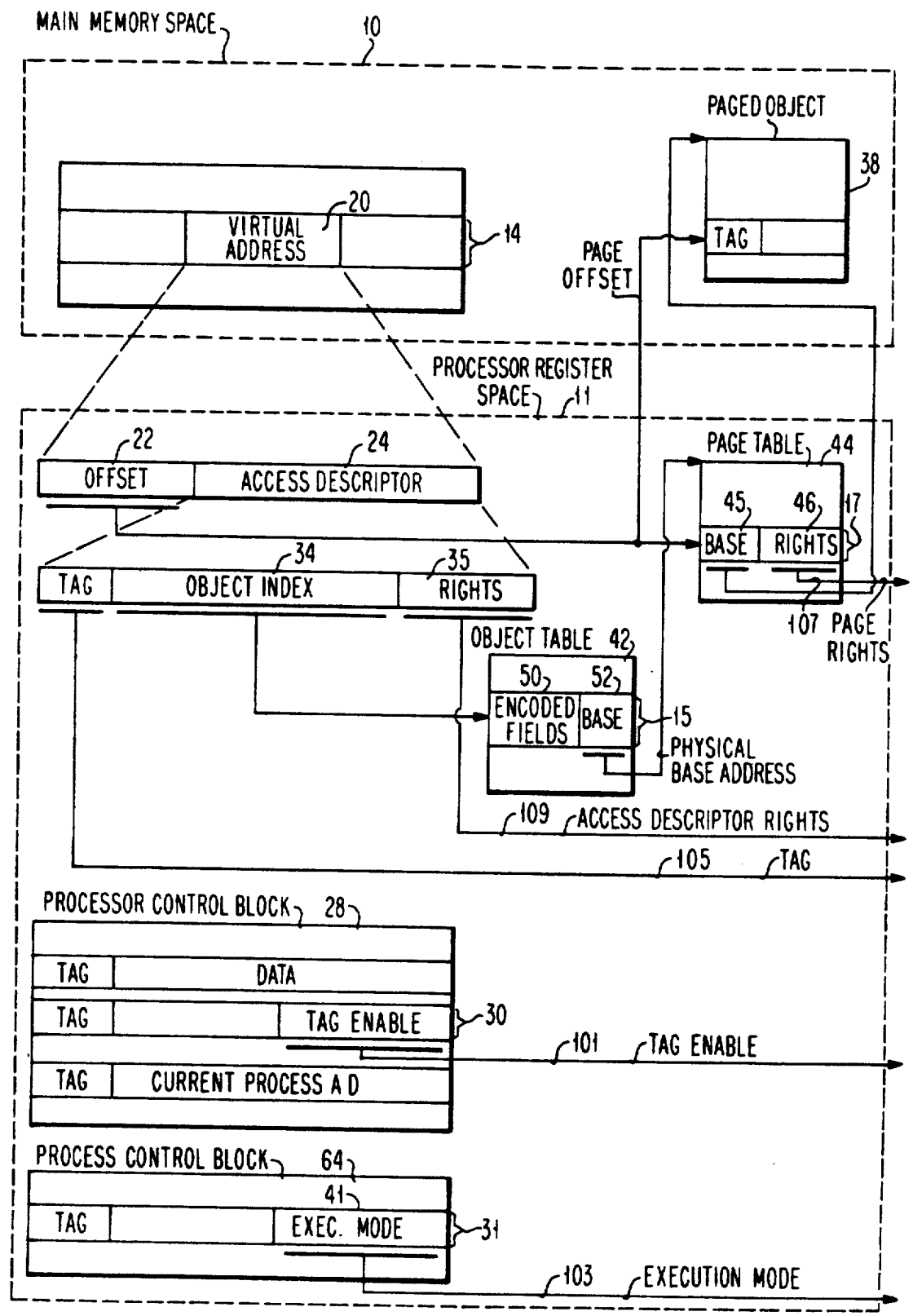
FIG. 2 is a more detailed block diagram of the processor registers portion of the translation lookaside buffer (TLB) of FIG. 1 and of system objects for supporting object addressing and protection in the main memory shown in FIG. 1.
Figure 4A:
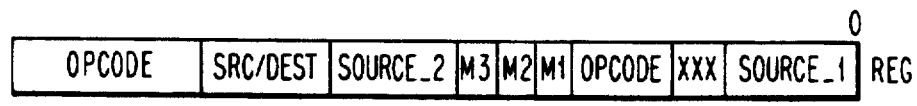
FIGS. 4a-4e are diagrams of various instruction formats of the present invention.
Figure 4B:
Figure 4C:
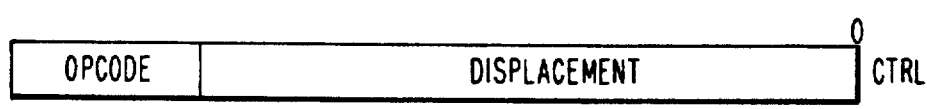
Figure 4D:
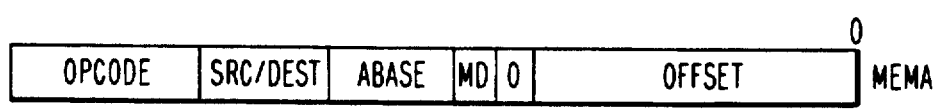
Figure 4E:
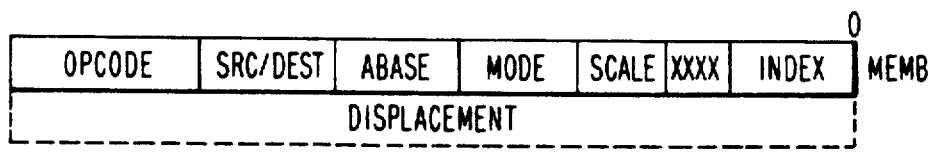

Refer to FIG. 2. For a memory request, an instruction (14) specifies an Access Descriptor (24), an Object Offset (22) within an address (20), whether it is a Read or a Write access, and the Length of the Request.

The following describes the address translation of a virtual address (20) to a physical address for accessing a paged object (38):

(1) Compute the last byte of the memory request by adding the request length to the object offset.

(2) Perform the request as two separate memory requests.

(3) Determine the rep rights needed by the request type.

(4) Raise a PROTECTION fault if the rights needed are not presented in the read and write rights (35) of the AD.

(5) Read the object table entry (15) selected by the object index (34) of the access descriptor. The entry type and valid bit are found in the encoded fields (50) of the object table entry. Raise a DESCRIPTOR fault if the entry type is not appropriate. Raise a VIRTUAL MEMORY fault if the object table entry is not a valid storage descriptor.

(6) Assuming that the object table entry is for a paged object, raise a PROTECTION fault if the directory index and page index found in the offset portion (22) of the address of the memory request is greater than the object length in the paged object descriptor (17) found in the page table (44).

(7) Scale the page index (bits 12-21 of the offset in the address) by 4 and add it to the base address in the object descriptor (in the object table-42) to form the physical address of the selected data page table entry (17) in the page table (44).

(8) Read the page table entry (17) and raise a VIRTUAL MEMORY fault if the page table entry is marked as invalid.

(9) Raise a RIGHTS PROTECTION fault if the access descriptor rights (35) are greater than the page rights (46).

(10) Combine the page offset (bits 0-11 of the address offset field-22) with the base address (45) in the page table entry in the page table (44) to form the physical address of the paged object (38) referenced by the memory request.

Object Reference Testing

COMPARE_MIXED and CHECK_TAG instructions

The COMPARE_MIXED instruction compares both ADs or data for equality. If both operands are ADs, the instruction tests whether they reference the same object. If both operands are data, the instruction test whether the data value are equal. The CHECK_TAG instruction checks for the tag bit.

In an untagged system in supervisor mode, the tag bit is assumed to be set in COMPARE_MIXED.

In the Ada expression "access_type_variable=null" where AD is used to represent access variable, the CHECK_TAG should be used instead of the COMPARE_MIXED with zero because any non-zero data values still cannot be used to reference an object.

Access Descriptor Creation

The protection system requires that the tag bit not be set to one arbitrarily, that lifetime checking not be bypassed, and that the mutator operation not be ignored. However, in certain controlled situations, system software needs to create an access descriptor (AD) for an existing object. This is accomplished by the CREATE_ACCESS_DESCRIPTOR instruction.

The CREATE_ACCESS_DESCRIPTOR instruction converts a data word to an AD.

Object Addressing Instructions

LOAD_PHYSICAL_ADDRESS

The LOAD_PHYSICAL_ADDRESS instruction returns the physical address of the operand.

While the invention has been particularly shown and described with reference to preferred embodiments thereof, it will be understood by those skilled in the art that the foregoing and other changes in form and detail may be made therein without departing from the scope of the invention.

I claim:

1. A data processing system including a memory (10); a processor (12), connected to said memory (10) for executing an operation by means of an operator specified in an instruction (14);

first means in said processor (12) for operating in at least two modes of operation, one of said modes of operation being a user mode for invoking application programs and another of said modes of operation, being a supervisor mode for invoking an operating system, said instruction (14) being executable in either mode, and, a plurality of addressable objects, including a paged object (38), said objects being stored in an address space of said memory (10), said address space being shared by said processor (12) and a number of other processors, said processor (12) including addressing (16) means for storing object descriptors having base and length information stored therein for use in locating objects in said address space, said plurality of addressable objects including instruction objects comprised of instructions including said instruction (14) defining an operation;

an address (20) referenced in said instruction (14), said address being specified as an offset (22) and an access descriptor (24);

said plurality of addressable objects including a processor object (28), an object table object (42), a page table object (44), and a process object (64);

said data processing system comprising:

processor register means in said processor for storing, internally in said processor, words and a tag bit means associated with each word read from said memory;

said tag bit means (48) associated with each word in said processor register (11) indicating, when having a first encoding, that said word is a data word and when having second encoding that said word is a valid access descriptor;

each of said objects being comprised of words, each word being either an access descriptors (30) or a data word (32);

said access descriptor (30) including
1. an object index means (34) for selecting an object in said address space, and
2. a rights field means, said rights field means specifying permissible operations on said paged object (38) selected by said access descriptor (30);

said processor object (28) including a processor control block;

an access descriptor means (33) in said processor control block for containing a tag enable bit;

first means for storing said object table object (42) at an address accessible by said processor upon processor initialization, second means for associating said object table object (42) with said processor (12) and said number of other processors which share said address space, third means for storing in said object table object (42) having object descriptors (15) for use by said addressing means (10) in forming physical addresses to said page table object (44), each of said object descriptors (15) including a first encoded field (50) and a second encoded field (52) specifying a base address and size, of a page table object referenced by an access descriptor;

fourth means for storing in said page table (44) page table entries (17) for use by said addressing mechanism (10) in forming physical addresses to said paged object (38), said offset (22) including a page index used to index into a selected page table to locate said page table entry, and a page offset used in conjunction with a base address stored in said page table entry to locate a datum entry in said paged object (38);

fifth means for locating a first object descriptor in said object table, by utilizing a known virtual address and said object index (34) as an index into said object table (42);

said addressing mechanism (16) including means for combining a base address in an object descriptor with said page offset to form an address with which to locate said paged object (38);

sixth means in said process object (64) for defining a process currently running on said processor, said process object including a process control block which specifies an execution environment, records an execution status of its program and maintains information about system resources allocated to said process;

seventh means in one of said access descriptors in said process control block for containing an execution mode indication means (68) which can be set to a value representing either said user mode or said supervisor mode; and eighth means (100, 102, 104) for asserting a tag signal (111) in response to said tag enable bit (40) being in a disabled state and said execution mode indication means (68) being set to said value representing said supervisor mode.

2. The data processing system in accordance with claim 1 wherein said page table entries (17) include a page table entry having a page rights field (107) and said access descriptor (24) includes a rights field (109), said data processing system further including:

ninth means (106) for comparing said page rights field (107) of said page table entry with said rights field (109) of said access descriptor (24) and for asserting a fault (113) upon the condition that an access permitted by said page rights field (107) is inconsistent with said rights field (109) of said access descriptor.

3. In a data processing system including a memory (10);

a processor (12), connected to said memory (10) for executing an operation by means of an operator specified in an instruction (14);

first means in said processor (12) for operating in at least two modes of operation, one of said modes of operation being a user mode for invoking application programs and another of said modes of operation being a supervisor mode for invoking an operating system, said instruction (14) being executable in either mode, and, a plurality of addressable objects, including a paged object (38), said objects being stored in an address space of said memory (10), said address space being shared by said processor (12) and a number of other processors, said processor (12) including addressing (16) means for storing object descriptors having base and length information stored therein for use in locating objects in said address space, said plurality of addressable objects including instruction objects comprised of instructions including said instruction (14) defining an operation;

an address (20) referenced in said instruction (14), said address being specified as an offset (22) and an access descriptor (24);

said plurality of addressable objects including a processor object (28), an object table object (42), a page table object (44), and a process object (64);

method comprising:

A. storing, internally in a processor register (11) in said processor, words and a tag bit (48) associated with each word read from said memory;

said tag bit (48) associated with each word in said processor register (11) indicating, when having a first encoding, that said word is a data word and when having second encoding that said word is a valid access descriptor;

each of said objects being comprised of words, each word being either an access descriptors (30) or a data word (32);

said access descriptor (30) including
 1. an object index (34) for selecting an object in said address space, and
 2. a rights field, said rights field specifying permissible operations on said paged object (38) selected by said access descriptor (30);

said processor object (28) including a processor control block;

an access descriptor (33) in said processor control block containing a tag enable bit;

B. storing said object table object (42) at an address accessible by said processor upon processor initialization, said object table being associated with said one processor and said number of other processors which share said address space, C. storing in said object table, object descriptors (15) for use by said addressing mechanism (10) in forming physical addresses to said page table object, each of said object descriptors (15) including a first encoded field (50) and a second encoded field (52) specifying a base address and size, of a page table object referenced by said access descriptor;

D. storing in said page table (44) page table entries (17) for use by an addressing mechanism (10) in forming physical addresses to said paged object (38), E. utilizing a page index in said offset (22) to index into a selected page table to locate said page table entry, and a page offset used in conjunction with a base address stored in said page table entry to locate a datum entry in said paged object (38);

F. locating a first object descriptor in said object table, by utilizing a known virtual address and said object index (34) as an index into said object table (42);

G. combining a base address in an object descriptor (44) with said page offset to form an address with which to locate said paged object (38);

said process object (64) defining a process currently running on said processor, said process object including a process control block which specifies an execution environment, records a execution status of its program and maintains information about system resources allocated to said process currently running on said processor;

H. setting an execution mode indication means (68) in one (66) of said access descriptors in said process control block to a value representing either said user mode or said supervisor mode;

I. asserting a tag signal in response to said tag enable bit (40) being in a disabled state and said execution mode indication means (68) being set to said value representing said supervisor mode.

4. The method in accordance with claim 3 wherein said page table entry includes a page rights field (107) further comprising the steps of:

J. comparing said page rights field (107) of said page table entry with said rights field of said access descriptor; and, K. asserting a fault (113) upon the condition that an access permitted by said page rights field is inconsistent with said rights field of said access descriptor.

* * * * *